United States Patent
Baker et al.

(10) Patent No.: US 12,499,024 B2
(45) Date of Patent: Dec. 16, 2025

(54) AUTOMATED FAULT SCENARIO GENERATION FOR CHAOS ENGINEERING

(71) Applicant: Microsoft Technology Licensing, LLC, Redmond, WA (US)

(72) Inventors: William Tigard Baker, Redmond, WA (US); Dallas Allen Warren, Redmond, WA (US); Aaron Edward Dietrich, Kirkland, WA (US); Piyush Gupta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 18/214,609

(22) Filed: Jun. 27, 2023

(65) Prior Publication Data
US 2025/0077374 A1    Mar. 6, 2025

(51) Int. Cl.
*G06F 11/26* (2006.01)
*G06F 11/263* (2006.01)

(52) U.S. Cl.
CPC .................. *G06F 11/263* (2013.01)

(58) Field of Classification Search
CPC ............. G06F 11/263; G06F 2201/865; G06F 11/3414; G06F 11/3466; G06F 11/3684; G06F 11/3688
See application file for complete search history.

(56) References Cited

U.S. PATENT DOCUMENTS

| | | | |
|---|---|---|---|
| 9,507,701 B2 * | 11/2016 | Mirza | G06F 11/366 |
| 9,842,045 B2 | 12/2017 | Heorhiadi et al. | |
| 10,795,793 B1 | 10/2020 | Arunachalam | |
| 10,819,618 B1 * | 10/2020 | Wada | H04L 43/50 |

(Continued)

FOREIGN PATENT DOCUMENTS

CN    112907140 A  *  6/2021  ............... G06N 7/01

OTHER PUBLICATIONS

Lutkevich et al (definition: chaos engineering, Tech Target, Jun. 2021) https://www.techtarget.com/searchitoperations/definition/chaos-engineering (Year: 2021).*

(Continued)

*Primary Examiner* — Michael Maskulinski
*Assistant Examiner* — Kayo Lisa Rusin
(74) *Attorney, Agent, or Firm* — Cantor Colburn LLP; Patrick Chinkiwsky

(57) ABSTRACT

Aspects of the disclosure include methods and systems for performing automated fault scenario generation for chaos engineering. Aspects include obtaining a configuration of a service under test, obtaining a first plurality of fault scenarios, and applying each of the first plurality of fault scenarios to the service under test. Aspects also include recording telemetry data regarding an operation of the service under test under each of the fault scenarios, selecting, based on the telemetry data, a first fault scenario from the fault scenarios, and generating a second plurality of fault scenarios. Aspects further include applying each of the second plurality of fault scenarios to the service under test, recording telemetry data regarding the operation of the service under test under each of the second plurality of fault scenarios, and identifying a vulnerability of the service under test based on the recorded telemetry data.

20 Claims, 8 Drawing Sheets

(56) References Cited

U.S. PATENT DOCUMENTS

| | | |
|---|---|---|
| 11,080,157 B1 | 8/2021 | Roberts |
| 2014/0082420 A1 | 3/2014 | Greer |
| 2018/0191579 A1 | 7/2018 | Gururao et al. |
| 2018/0285239 A1 | 10/2018 | Papak et al. |
| 2022/0245045 A1 | 8/2022 | Ajiro |
| 2022/0308972 A1* | 9/2022 | Anand ........... G06Q 10/063112 |
| 2022/0353143 A1* | 11/2022 | Hill .................... H04L 41/0813 |
| 2022/0398187 A1* | 12/2022 | Balasubramanian ....................... G06F 11/3476 |
| 2024/0118991 A1* | 4/2024 | Zakharchenko .... G06F 11/3664 |
| 2024/0311201 A1* | 9/2024 | Jha ........................ G06F 9/505 |
| 2024/0385950 A1* | 11/2024 | Verma ................ G06F 11/3684 |
| 2024/0388496 A1* | 11/2024 | Garcarz ............. H04L 41/0645 |
| 2024/0411542 A1* | 12/2024 | Goyal ..................... G06F 8/433 |
| 2025/0005162 A1 | 1/2025 | Baker et al. |
| 2025/0053501 A1* | 2/2025 | Ayyadurai ............ G06N 20/00 |

OTHER PUBLICATIONS

Hiter (7 steps of the vulnerability assessment process explained, eSecurity Planet, 2023) https://www.esecurityplanet.com/networks/vulnerability-assessment-process/ (Year: 2023).*

CN-112907140-A1 translation PE2E generated (Year: 2025).*

International Search Report and Written Opinion received for PCT Application No. PCT/US2024/034228, mailed on Dec. 5, 2024, 24 pages.

International Search Report and Written Opinion received for PCT Application No. PCT/US2024/034226, mailed on Oct. 17, 2024, 19 pages.

Invitation to pay additional fees received for PCT Application No. PCT/US2024/034228, Oct. 11, 2024, 20 pages.

Ji, et al., "PerfCE: Performance Debugging on Databases with Chaos Engineering-Enhanced Causality Analysis", arXiv:2207.08369v2, Sep. 14, 2023, 13 pages.

Sharma, et al., "A Guided Approach Towards Complex Chaos Selection, Prioritisation and Injection", 15th International Conference On Cloud Computing (CLOUD), 2022, pp. 91-93.

Non-Final Office Action mailed on Apr. 7, 2025, in U.S. Appl. No. 18/214,627, 31 pages.

* cited by examiner

| Service Under Test ID | Configuration ID | Fault Scenario ID | Telemetry Metric 1 | Telemetry Metric ... | Telemetry Metric N | SLI 1 | SLI ... | SLI N |
|---|---|---|---|---|---|---|---|---|
| 0001 | 1001 | 0001 | | | | | | |
| 0001 | 1001 | 0002 | | | | | | |
| 0001 | 1001 | 0003 | | | | | | |
| 0001 | 1001 | 0004 | | | | | | |

FIG. 3

| Fault SEC ID | Anomaly ID_1 | Anomaly ID_2 | .... | Anomaly ID_N |
|---|---|---|---|---|
| 0001 | 0101 | 0102 | | 0107 |
| 0002 | 0102 | 0105 | | 0109 |
| 0003 | 0101 | 0107 | | 1111 |
| 0004 | 0102 | 0107 | | 1025 |

| Anomaly ID | Comp. Resource_ID | Comp. Resource_Type | Anomaly Type | Anomaly rate | Anomaly start_time | Anomaly end_time |
|---|---|---|---|---|---|---|
| 0101 | 23562 | Memory | MEMORY PRESSURE | 5% | 0:10 | 0:30 |
|  |  |  |  |  |  |  |
|  |  |  |  |  |  |  |
|  |  |  |  |  |  |  |

| Configuration ID | Computing Resource_ID | Computing Resource_Type | Related Computing Resource_ID | Relation Type | Related Computing Resource_ID | Relation Type |
|---|---|---|---|---|---|---|
| 1001 | 12354 | Processing System | 45620 | Connected to | 45630 | Connected to |
| 1001 | 23562 | Memory | 12354 | Part of |  |  |
| 1001 | 36523 | Processor | 12354 | Part of |  |  |
| 1001 | 45620 | Communications link | 12354 | Connected to |  |  |

FIG. 6

AUTOMATED FAULT SCENARIO GENERATION FOR CHAOS ENGINEERING

INTRODUCTION

The subject disclosure relates to service validation, and particularly to automated fault scenario generation for chaos engineering.

In general, service validation of a computing system refers to the process of ensuring that a particular service or software system meets its intended requirements and functions correctly. Service validation involves testing and validating various aspects of the computing system to ensure its reliability, performance, security, and compliance with desired specifications.

Service validation typically begins by defining the requirements and expectations for the computing system or service, such as the functionality, performance targets, security measures, scalability, compatibility, and any other relevant criteria. Once the requirements and expectations are defined, a test plan is developed that outlines the test objectives, test cases, test scenarios, and testing methodologies to be employed. Next, the computing system or service's performance is assessed by conducting various tests, such as load testing, stress testing, and scalability testing. These tests help determine how the system performs under different workloads and ensure it can handle expected user traffic. Service validation is an iterative process that may involve multiple testing cycles and continuous improvement based on feedback and findings to ensure that the computing system delivers the intended functionality, reliability, performance, and security to meet the requirements of its users.

Chaos engineering is a discipline that involves intentionally introducing controlled disruptions or failures into a service or software system to test its resilience and identify potential weaknesses. One goal of chaos engineering is to discover and address vulnerabilities before they occur in real-world scenarios. Currently, chaos engineering systems require users to manually design experiments to simulate various failure scenarios. These experiments are then executed to inject failures or disruptions into the system. During the experiments the behavior of the system is monitored, and relevant metrics and data are collected and analyzed the system's response to the various failures.

Performing service validation using chaos engineering traditionally requires the manual configuration of each chaos experiment that will be applied. The manual creation of such experiments is a time-consuming task. In addition, manually crafted chaos experiments are static and will therefore require manual updating to keep the chaos experiments up to date with changes made to the service being tested. Furthermore, since each chaos experiment must be manually crafted, the scope and breadth of the chaos experiments are limited to the type and combination of failures that are foreseeable to the designer of the chaos experiments.

SUMMARY

Embodiments of the present disclosure are directed to methods for performing automated fault scenario generation for chaos engineering. An example method includes obtaining a configuration of a service under test, the configuration of the service includes a plurality of computing resources utilized by the service and a relationship between individual computing resources of the plurality of computing resources. The method also includes obtaining a first plurality of fault scenarios, each fault scenario of the first plurality of fault scenarios including an anomaly that is applied to a corresponding computing resource of the plurality of computing resources and applying each of the first plurality of fault scenarios to the service under test. The method also includes recording telemetry data regarding an operation of the service under test under each of the first plurality of fault scenarios, selecting, based on the telemetry data, a first fault scenario from the first plurality of fault scenarios, and generating, based at least in part on the first fault scenario, a second plurality of fault scenarios. The method further includes applying each of the second plurality of fault scenarios to the service under test, recording telemetry data regarding the operation of the service under test under each of the second plurality of fault scenarios, and identifying a vulnerability of the service under test based on the recorded telemetry data. The configuration of the service under test includes a plurality of computing resources utilized by the service under test and a relationship between one or more of the plurality of computing resources and each fault scenario includes an anomaly that is applied to a computing resource of the configuration.

Embodiments of the present disclosure are directed to methods for performing automated fault scenario generation for chaos engineering. An example method includes obtaining a configuration of a service under test, recording a first set of telemetry data regarding an operation of the service under test under normal operating conditions, and calculating an expected value for each of a plurality of service level indicators of the service under test based on the first set of telemetry data. The method also includes obtaining a first plurality of fault scenarios, applying each of the first plurality of fault scenarios to the service under test, and recording a second set of telemetry data regarding the operation of the service under test under each of the first plurality of fault scenarios. The method further includes calculating a first value for each of the plurality of service level indicators of the service under test under each of the first plurality of fault scenarios based on the second set of telemetry data, selecting, based on a difference between the first values and the expected values, a first fault scenario from the first plurality of fault scenarios, and generating, based at least in part on the first fault scenario, a second plurality of fault scenarios. The method also includes applying each of the second plurality of fault scenarios to the service under test, recording a third set of telemetry data regarding the operation of the service under test under each of the second plurality of fault scenarios, and identifying a vulnerability of the service under test based at least in part on the third set of telemetry data. The configuration of the service under test includes a plurality of computing resources utilized by the service under test and a relationship between one or more of the plurality of computing resources and each fault scenario includes an anomaly that is applied to a computing resource of the configuration.

Embodiments of the present disclosure are directed to methods for performing automated fault scenario generation for chaos engineering. An example method includes obtaining a configuration of a service under test, an expected value for each of a plurality of service level indicators of the service under test, and a first plurality of fault scenarios, applying each of the first plurality of fault scenarios to the service under test, and recording a first set of telemetry data regarding an operation of the service under test under each of the first plurality of fault scenarios. The method also includes calculating, based on the first set of telemetry data, a first value for each of the plurality of service level indicators of the service under test corresponding to each of the first plurality of fault scenarios, selecting, based on a difference between one or more of the first values and the expected values, a first fault scenario from the first plurality of fault scenarios, and generating, based at least in part on the first fault scenario, a second plurality of fault scenarios. The method further includes applying each of the second plurality of fault scenarios to the service under test, recording a second telemetry data regarding the operation of the service under test under each of the second plurality of fault scenarios, and identifying a vulnerability of the service under test based at least in part on the second set of recorded telemetry data. The configuration of the service under test includes a plurality of computing resources utilized by the service under test and a relationship between one or more of the plurality of computing resources and each fault scenario includes an anomaly that is applied to a computing resource of the configuration.

Other embodiments of the present disclosure implement features of the above-described methods in computer systems and computer program products.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

FIG. 3 depicts a table of an example telemetry database illustrating a plurality of fault scenarios and telemetry data associated with each of the plurality of fault scenarios in accordance with one or more embodiments;

FIG. 4 depicts a table of an example telemetry database illustrating a plurality of fault scenarios and a plurality of anomalies associated with each of the plurality of fault scenarios in accordance with one or more embodiments:

FIG. 5 depicts a table of an example telemetry database illustrating a plurality of anomalies in accordance with one or more embodiments:

FIG. 6 depicts a table of an example telemetry database illustrating a plurality of configurations of a service under test in accordance with one or more embodiments:

Figure 1:
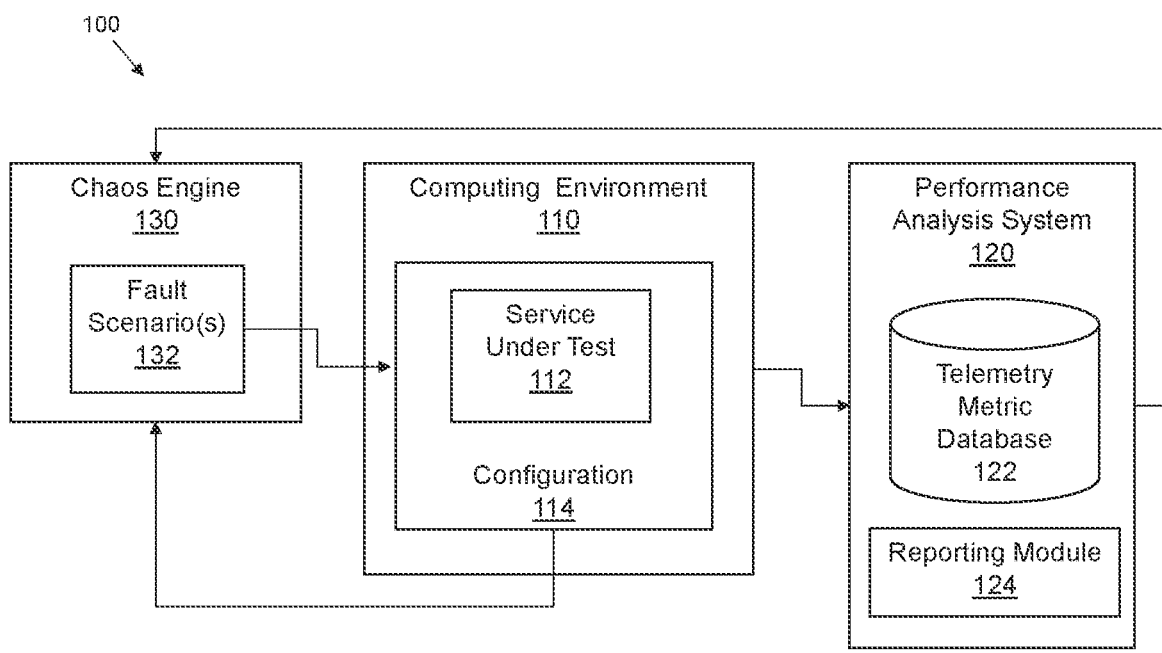
FIG. 1 depicts a block diagram of an example system for automated service validation in accordance with one or more embodiments.

The diagrams depicted herein are illustrative. There can be many variations to the diagrams or the operations described therein without departing from the spirit of the disclosure. For instance, the actions can be performed in a differing order or actions can be added, deleted, or modified.

In the accompanying figures and following detailed description of the described embodiments of the disclosure, the various elements illustrated in the figures are provided with two or three-digit reference numbers. With minor exceptions, the leftmost digit(s) of each reference number corresponds to the figure in which its element is first illustrated.

DETAILED DESCRIPTION

As discussed above, current methods for performing service validation using chaos engineering require manual configuration of each chaos experiment. The manual creation of such experiments is time-consuming to both create and update as the service being tested changes over time. In addition, since each chaos experiment must be manually crafted, the scope and breadth of the chaos experiments are limited to the type and combination of failures that are foreseeable to the designer of the chaos experiments. In other words, the type and scope of the potential disruptions or failures that will be simulated by the chaos experiments are limited to the disruptions and failures thought of by the designer of the chaos experiments.

This disclosure involves the automatic creation of chaos experiments, also referred to herein as fault scenarios, to perform automated service validation using chaos engineering. In one embodiment, a configuration of a service under test is obtained and a chaos engine creates a first set of fault scenarios based on the configuration. The set of fault scenarios includes at least one fault scenario. The first set of fault scenarios may be generated by randomly creating disruptions and failures, referred to herein as anomalies, that are applied to various computing resources of the configuration. A failure refers to a situation where a computing resource or dependent service is completely inaccessible, a disruption refers to a situation where a computing resource or dependent service is not functioning as expected, and an anomaly generally refers to a situation where a computing resource is not functioning as expected or is completely inaccessible.

The first set of fault scenarios are then applied to the service under test and telemetry data regarding the operation of the service under test during each of the fault scenarios are collected. The chaos engine then analyzes the telemetry data regarding the operation of the service under test during each of the fault scenarios and responsively creates a second set of fault scenarios. The second set of fault scenarios are then applied to the service under test and telemetry data regarding the operation of the service under test during each of the fault scenarios are collected. This iterative process can be repeated a desired number of times, for a desired duration, or until another condition is met.

In one embodiment, a performance analysis system is provided that calculates a plurality of service level indicators (SLIs) for the service under test during the application of each fault scenario. The SLIs can be compared to service level objectives (SLOs) of the service to identify fault scenarios in which the SLIs fail to meet the SLOs. In one embodiment, a vulnerability of the service under test can be identified based on commonalities of fault scenarios in which the SLIs fail to meet the provided SLOs. In some embodiments, the performance analysis system also monitors for the occurrence of events like crashes in the service under test.

Advantageously, automated service validation using chaos engineering reduces the amount of time required for service operators to perform service validation using chaos engineering by automatically creating fault scenarios to be applied to a service under test, recording the telemetry of the service under test during the fault scenarios, and responsively creating and apply additional fault scenarios. In addition, automated service validation using chaos engineering increases the scope and breadth of the disruptions and failures included in the fault scenarios by randomly creating fault scenarios and iteratively creating new fault scenarios to apply to the service under test based on identified impacts of previously applied fault scenarios. As a result of applying automated service validation using chaos engineering, the reliability of the service under test is improved.

Referring now to FIG. 1, a block diagram of a system 100 for automated service validation in accordance with one or more embodiments is shown. As illustrated, the system 100 includes a computing environment 110, a performance analysis system 120, and a chaos engine 130. Although illustrated as discrete items, one or more of the computing environment 110, the performance analysis system 120, and the chaos engine 130 may be embodied in a single computing system, such as the one shown in FIG. 10. Alternatively, each of the computing environment 110, the performance analysis system 120, and the chaos engine 130 may be embodied in separate computing systems, such as the one shown in FIG. 10.

In one embodiment, the computing environment 110 includes a configuration 114 of computing resources (e.g., hardware, software, and network resources) that are used to execute the service under test 112. As used herein, a service, refers to a managed software that includes hosted applications that are provided over a network, such as the internet. The service performs various tasks such as responding to hardware events, listening for data requests from other software. The service is managed and maintained by a service provider, and users access the service through a web browser or a client application. The computing environment 110 includes monitoring and logging mechanisms that capture relevant telemetry data of the computing resources and the service under test 112 during the operation of the service under test 112. The telemetry data are stored in the telemetry metric database 122 of the performance analysis system 120.

In one embodiment, the chaos engine 130 is a computing system that is configured to create fault scenarios 132 that are applied to the service under test 112. Each fault scenario 132 includes one or more anomalies, such as injecting network latency, randomly terminating services, introducing a central processing unit (CPU) spikes, or simulating sudden increases in user traffic (e.g., creating and injecting artificial sure traffic to the service under test). The chaos engine 130 can generate fault scenarios 132 based on one or more of the configurations 114 of computing resources, data relating to the operation of the service under test 112 from the performance analysis system 120, and user input. The fault scenarios 132 may be generated by randomly creating anomalies that are applied to various computing resources of the configuration. For example, the chaos engine 130 may obtain the configuration 114 of the computing environment 110 to identify the computing resources in the computing environment 110 and use this information during the creation of the anomalies in the fault scenarios. For example, the chaos engine 130 may identify each computing resource and a type of each computing resource in the configuration 114 and select anomalies to apply to one or more of the computing resources for a fault scenario 132.

In one embodiment, the chaos engine 130 is configured to obtain the configuration 114 of computing environment, identify the computing resources in the configuration, and generate a random set of anomalies to create each of the fault scenarios. Each of the random anomalies may include both an anomaly rate and an anomaly start and end time. In one embodiment, one or more of the first set of fault scenarios is selected from previous runs of the system. For example, rather than starting with only randomly generated fault scenarios, the fault scenarios can include one or more fault scenarios that were previously run on the service under test and that were identified as important (e.g., because those previous fault scenarios result in the service under test crossing its SLO thresholds). In another embodiment, the fault scenarios can include one or more fault scenarios that are known to be impactful to other services that have been tested, when the configuration of those services is similar to the current service under test (e.g., both services might use VMs, switches, and a SQL server).

In one embodiment, the configuration 114 of the service under test 112 and data relating to the operation of the service under test 112 under a first fault scenario are stored in a telemetry metric database 122 of the performance analysis system 120. In one embodiment, the computing resource in the configuration are configured to collect and transmit telemetry to the telemetry metric database 122. In addition, the service under test 112 is configured to emit telemetry data that is recorded in the telemetry metric database 122. The chaos engine 130 is configured to analyze the data relating to the operation of the service under test 112 under the first fault scenario and to responsively generate one or more additional fault scenarios that are applied to the service under test. For example, the chaos engine 130 analyzes the data in the telemetry metric database 122 relating to the operation of the service under test 112 under a first fault scenario to identify one or more anomalies of the first fault scenario that impacted the operation of the service under test 112 and generates additional fault scenarios by modifying the identified anomalies. The identification of one or more anomalies of the first fault scenario that impacted the operation of the service under test 112 may be based on a comparison of the SLIs of the service under test 112 during the fault scenario to the SLOs for the service under test 112. The chaos engine 130 may iteratively create new additional fault scenarios that include modifying anomalies to quantify the impact that each anomaly has on the service under test 112. For example, SLIs corresponding to a first fault scenarios having a dropped packet anomaly with an anomaly rate of fifty percent can be compared to SLIs corresponding to fault scenarios having a dropped packet anomaly with an anomaly rates of twenty-five and seventy-five percent, to quantify the impact that the dropped packet anomaly has on the service under test 112. In one embodiment, the impact that the dropped packet anomaly can be quantified by providing an anomaly rate at which the SLI begins to fail to meet its corresponding SLO.

In one embodiment, an iterative process of applying a fault scenario, analyzing telemetry data of the service under test during the fault scenario, and responsively generating one or more additional fault scenarios is executed until a termination condition is met. In one embodiment, the termination condition may specify a total time allowed for the testing of various fault scenarios. In another embodiment, the termination condition may be a determination that a service level indicator of the service under test has exceeded a threshold value, which may be set by an operator of the service under test 112. In a further embodiment, the termination condition may be a determination that a service level indicator of the service under test has deviated from an expected value by more than a threshold amount, which may be set by an operator of the service under test 112.

In one embodiment, the performance analysis system 120 is a computing system that analyzes the behavior of the service under test 112 and the computing resources utilized by the service under test 112. The performance analysis system 120 collects and stores telemetry data from the computing environment 110 and the service under test 112 in the telemetry database 122.

In one embodiment, the performance analysis system 120 calculates one or more Service Level Indicators (SLIs) of the service under test 112 based on the data stored in the telemetry database 122. SLIs are measurements used to assess the performance, availability, and quality of the service under test 112. The SLIs can include availability SLIs, response time SLIs, throughput SLIs, error rate SLIs, latency SLIs, and capacity SLIs of the service under test 112.

Availability SLIs measure the uptime or the percentage of time the service under test 112 is available to users. Availability SLIs indicate the reliability and accessibility of the service under test 112. Availability is typically expressed as a percentage. Response time SLIs measure the time it takes for the service under test 112 to respond to a request. Response time SLIs indicate the performance and user experience of the service under test 112. Response time is typically measured in milliseconds and can be broken down into metrics like average response time, 95th percentile response time. Throughput SLIs measure the number of requests or transactions the service under test 112 can handle within a given time period. Throughput SLIs indicate the capacity and scalability of the service under test 112. Throughput is often measured in requests per second (RPS) or transactions per second (TPS). Error rate SLIs measure the percentage of failed or erroneous requests or transactions. Error rate SLIs indicate the reliability and the occurrence of errors or failures in the system under test. The error rate can be expressed as a percentage or the number of errors per a specific number of requests. Latency SLIs measure the time it takes for a request to travel from the sender to the receiver and receive a response. Latency SLIs indicate the responsiveness of the system under test 112. Latency is typically measured in milliseconds. Capacity SLIs measure the resource utilization and capacity limits of the service under test 112. Capacity SLIs can include metrics like CPU usage, memory usage, disk space utilization, or network bandwidth consumption. Capacity SLIs help identify when the service under test 112 is approaching its resource limits and may require scaling or optimization.

In general, a vulnerability of the service under test 112 is a susceptibility of the service under test 112 to changes in operating conditions of the computing resources that make up the configuration 114 of the service under test 112. A vulnerability of the service under test 112 may include an identification of a particular computing resource of the configuration, a particular type of anomaly, or a combination of the computing resources and anomaly type. For example, one vulnerability of the service under test 112 may be a susceptibility of the service under test 112 to a dropped packet anomaly in which a dropped packet rate is greater that a specific percentage. In another example, one vulnerability of the service under test 112 may be a susceptibility of the service under test 112 to a combination of a dropped packet anomaly and an out of order delivery anomaly in which a dropped packet rate is greater that a specific percentage and an out of order deliver rate is greater than a specific amount. In one embodiment, the vulnerability of the service under test 112 is identified based on a determination that one or more anomalies cause one or more SLI of the service under test 112 to fail to meet the provided SLOs.

In one embodiment, the performance analysis system 120 identifies one or more vulnerabilities of the service under test 112 based on one or more of the calculated SLIs of the service under test 112, the data stored in the telemetry database 122, and one or more Service Level Objectives (SLOs) of the service under test 112. In one embodiment, the SLOs are desired target values for each SLI. In another embodiment, the SLOs are acceptable ranges for each SLI. The SLOs of the service under test 112 may be set by an operator of the service under test 112.

In one embodiment, the performance analysis system 120 includes a reporting module 124 that generates one or more reports, or error notifications, regarding the operation of the service under test 112 under the various fault scenarios. In addition, the reporting module 124 may transmit a report that includes an identification of identified vulnerabilities of the service under test 112 to the operator of the service under test 112. The identification of the vulnerabilities may include one or more computing resources and an identification of an anomaly type to which the computing resources are susceptible. In one embodiment, the generated report includes an identification of anomaly types and anomaly rates that were applied to computing resources that cause an SLI of the service to deviate from the SLO by more than a threshold amount.

Figure 2:
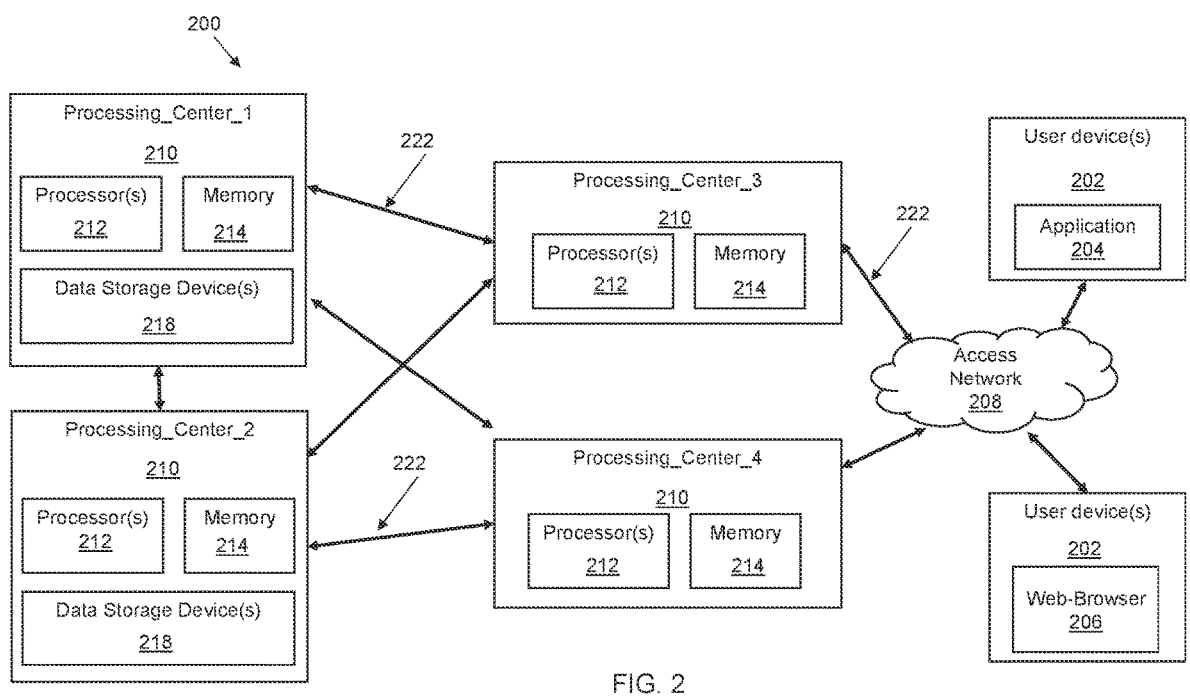
FIG. 2 depicts a block diagram of an example configuration of a computing environment for a service under test in accordance with one or more embodiments.

Referring now to FIG. 2, a block diagram of a configuration 200 of a computing environment for a service under test in accordance with one or more embodiments is shown. The configuration 200 shown is an example and is not intended to be limiting in any way. In one embodiment, the configuration 200 includes a plurality of computing resources that are utilized to execute the operation of a service under test.

In one embodiment, the configuration 200 includes a plurality of user devices 202 that are in communication with one or more processing centers 210 via an access network 208 and one or more communications links 222. In one embodiment, the processing centers 210 include servers that provides services, resources, or functionalities to other computers or user devices 202 via communications links 222. The user devices 202 can include a variety of user devices, such as personal computers, smartphones, tablets, or the like. The user devices 202 can include various software, such as applications 204, web browsers 206, or the like that is used to access a service under test that is being executed by the one or more processing centers 210. In one embodiment, the processing centers 210 include multiple computing resources, such as one or more processors 212 and memory devices 214.

In one embodiment, the processing centers 210 may be directly connected to one another via one or more communications links 222. In one embodiment, the processing centers 210 include multiple computing resources, such one or more processors 212, memory devices 214, and data storage device 218. In one embodiment, the processing centers 210 are used for storing and retrieving digital information utilized by the service under test.

In some embodiments, a configuration 200 for a service under test may include additional elements that are not shown in FIG. 2. In one embodiment, the configuration 200 for a service under test is created and managed by an operator of the service under test. The configuration 200 includes an identification of each computing resource e.g., the access network 208, the processing centers 210, the processors 212, the memory 214, the data storage devices 218, and the communication links 222) in the configuration and a relationship between one or more of the plurality of computing resources. As used herein, a computing resource is a hardware or infrastructure component that is used to support and enable the service under test. The computing resources can include servers, processors, memory devices, routers, switches, other networking equipment, hard disk drives, other storage devices, and other hardware components. In one embodiment, each computing resource can be characterized by a unique identification number and a type of the resource.

FIGS. 3, 4, 5, and 6 illustrate various tables of a telemetry database in accordance with one or more embodiments. The tables shown are intended to be examples and are not intended to be limiting in any way. In one embodiment, the chaos engine analyzes the data stored in the tables of the telemetry database to determine an impact that the applied fault scenarios had on the service under test. In addition, the chaos engine analyzes the data stored in the tables of the telemetry database to create additional fault scenarios that are applied to service under test. In one embodiment, the analysis of the data in the telemetry metric database includes comparing the SLIs corresponding to fault scenario to the SLOs of the service under test. By analyzing the data in the telemetry metric database relating to the operation of the service under test under various fault scenario the chaos engine identifies one or more anomalies that impact the operation of the service under test and generates additional fault scenarios by modifying the identified anomalies. For example, a determination that an anomaly of a fault scenario that impacted the operation of the service under test can be based on identifying an anomaly related to the SLI that has deviation of greater than a threshold amount from its corresponding SLO. The chaos engine iteratively creates new additional fault scenarios by modifying anomalies to quantify the impact that each anomaly has on the service under test. For example, SLIs corresponding to a first fault scenarios having a dropped packet anomaly with an anomaly rate of fifty percent can be compared to SLIs corresponding to fault scenarios having a dropped packet anomaly with anomaly rates of twenty-five and seventy-five percent, to quantify the impact that the dropped packet anomaly has on the service under test. In one embodiment, the impact that the dropped packet anomaly can be quantified by providing an anomaly rate at which the SLI begins to fail to meet its corresponding SLO.

FIG. 3 depicts a table 300 of a telemetry database illustrating a plurality of fault scenarios and telemetry data associated with each of the plurality of fault scenarios in accordance with one or more embodiments. As illustrated, table 300 includes a plurality of entries 302 that each include an identification of the service under test 304, an identification of the configuration 306 of the service under test, an identification of a fault scenario 308 applied to the configuration of the service under test, one or more telemetry data 310 collected during the application of the fault scenario to the configuration of the service under test, and one or more SLIs 312 calculated based on the telemetry data 310. In addition, the table 300 may include an SLO that corresponds to each SLI 314.

In one embodiment, the telemetry data can include the current CPU utilization of the computing resources in the configuration, indicating the percentage of each CPU capacity being utilized. The telemetry data also includes information on the memory usage of the computing resources in the configuration, including metrics such as total memory, used memory, and available memory. The telemetry data can capture the input/output operations of the data storage device of the computing resources in the configuration, including metrics like read/write throughput, latency, and queue length. Disk I/O data can be used to assess disk performance and identify potential bottlenecks or areas for optimization.

In one embodiment, the telemetry data can also include network traffic information, such as incoming and outgoing data rates, packet loss, latency, and network errors of the computing resources in the configuration. The telemetry data can provide insights into the load of the computing resources in the configuration, which includes metrics like the number of active processes, threads, or concurrent connections. The telemetry data can include application-specific performance metrics, such as response time, throughput, error rates, and transaction success rates. This data can be used to evaluate the performance and health of the application running on the computing resources in the configuration.

In one embodiment, the telemetry data can also include system and application event logs that capture important events, errors, warnings, and debug information. Monitoring and analyzing event logs can be used to diagnose issues, troubleshoot problems, and identify potential areas for improvement. The telemetry data can further include information on power consumption and temperature readings of the computing resources in the configuration. In addition, the telemetry data can also include custom-defined metrics that are specific to the computing resource or the application running in the configuration. These metrics could be tailored to monitor specific behaviors, performance indicators, or unique requirements of the computing resources in the configuration. For example, the operator of the service under test may indicate assign various importance levels to one or more of the telemetry data based on the service under test.

FIG. 4 depicts a table 400 of a telemetry database illustrating a plurality of fault scenarios and a plurality of anomalies associated with each of the plurality of fault scenarios in accordance with one or more embodiments. As illustrated, table 400 includes a plurality of entries 402 that each include an identification of a fault scenario 404 and one or more anomalies 406 that comprise the fault scenario 404.

FIG. 5 depicts a table 500 of a telemetry database illustrating a plurality of anomalies in accordance with one or more embodiments. As illustrated, table 500 includes a plurality of entries 502 that each include an identification of an anomaly 504, an identification of a computing resource 506 that the anomaly will be applied to, an identification of a type 508 of the computing resource 506, an anomaly type 510 that will be applied, an anomaly rate 512 that will be applied, an anomaly start time 514, and an anomaly end time 516. In some embodiments, a single anomaly can include more than one anomaly type 510 and associated anomaly rate 512. For example, an anomaly of a disruption of network traffic could specify a dropped packet anomaly type 510 with an associated anomaly rate 512 of a percentage of packets to be dropped and an out of order delivery anomaly type 510 with an associated anomaly rate 512 of a percentage of packets to deliver out of order. The anomaly type 512 specifies an irregularity or deviations from normal behavior for a computing resource. For example, for a communications link the anomaly type 512 can include a bandwidth reduction type, a dropped packet type, an out of order delivery type, or the like. In another example, for a processor the anomaly type can include a delay anomaly type, a utilization rate anomaly type, a clock frequency anomaly type, and an execution time anomaly type. For a memory device, the anomaly type can include a bit flip anomaly type, a latency anomaly type, a memory cell failure anomaly type, a stuck bit anomaly type, and a latency anomaly type.

FIG. 6 depicts a table 600 of a telemetry database illustrating a plurality of configurations of a service under test in accordance with one or more embodiments. As illustrated, table 600 includes a plurality of entries 602 that each include an identification of the configuration 604 of the service under test, an identification of a computing resource 606 of the configuration, an identification of a type 608 of the computing resource 606, an identification of a related computing resource 610 of the computing resource 606, an identification of type 612 of the relationship between the computing resource 606 and the related computing resource 610. As illustrated, each computing resource of the service under test may be related to multiple other computing resources of the service under test.

Figure 7:
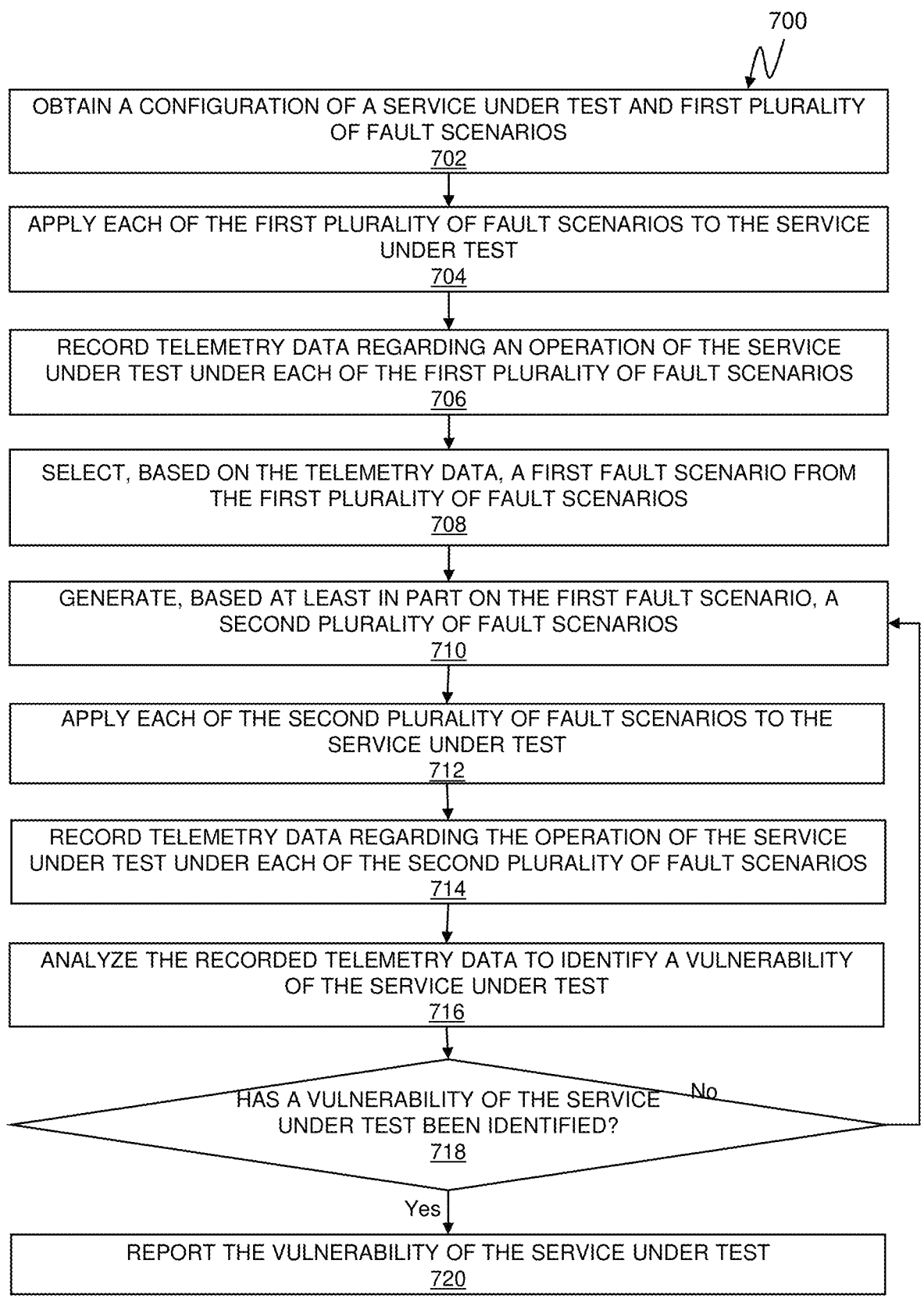
FIG. 7 depicts a flowchart of an example method for performing automated service validation with chaos engineering in accordance with one or more embodiments.

Referring now to FIG. 7, a flowchart of a method 700 for performing automated service validation with chaos engineering in accordance with one or more embodiments is shown. The method 700 is described with reference to FIGS. 1 to 6 and may include additional steps not depicted in FIG. 7. Although depicted in a particular order, the blocks depicted in FIG. 7 can be, in some embodiments, rearranged, subdivided, and/or combined.

At block 702, the method 700 begins by obtaining a configuration of a service under test and a first plurality of fault scenarios. In one embodiment, the configuration of the service under test includes a plurality of computing resources utilized by the service under test and a relationship between one or more of the plurality of computing resources. In one embodiment, the configuration of the service under test includes a plurality of computing resources utilized by the service under test but does not include all of the computing resources utilized by the service under test. The set of computing resources included by the configuration may be set by the operator of the service. For example, the operator of the service may identify the set of computing resources based on the service under test and/or based on the SLOs set by the operator of the service. In other embodiments, the configuration of the service under test includes all of the computing resources that are utilized by the service under test.

In one embodiment, each fault scenario includes one or more anomalies that are applied to computing resources of the configuration. Each anomaly is a disruption or failure of one or more of the computing resources in the configuration. In one embodiment, each anomaly includes an anomaly rate, such as a failure rate and/or a capacity reduction, for a computing resource and a start time of the anomaly and end time of the anomaly.

In one embodiment, the first set of fault scenarios is obtained based at least in part on the configuration. For example, the chaos engine may be configured to obtain the configuration of the service under test and to identify a first set of fault scenarios based on the configuration of the service under test. In one embodiment, this identification may be based on identifying one or more previously generated fault scenarios that were applied to similar configurations. For example, the chaos engine may include a database of previously generated fault scenarios that were applied to previous configurations and the chaos engine may be configured to identify a previous configuration that is similar to a current configuration. In one embodiment, a previous configuration may be determined to be similar to a current configuration based on the previous configuration including a threshold number, or threshold percentage, of computing resources that are the same as the current configuration. For example, a current configuration may include one hundred computing resources and a previous configuration may be determined to be similar if it includes more than seventy-five of the one hundred resources in the current configuration. One or more of fault scenarios that were applied to identified similar configuration may be used to create a fault scenario that is applied to the current configuration. The new fault scenarios may be created by copying the previously applied fault scenarios and removing any anomalies that correspond to computing resources that are not present in the current configuration.

In one embodiment, one or more of the first set of fault scenarios are randomly generated by the chaos engine. The randomly generated fault scenarios each include one or more randomly generated anomalies. For example, the chaos engine may be configured to obtain the configuration of the service under test, identify the computing resources in the configuration, and generate a random set of anomalies. One or more of the random set of anomalies are then randomly combined to create one or more of the first set of fault scenarios. In one embodiment, one or more of the first set of fault scenarios is selected from previous runs of the system. For example, rather than starting with only randomly generated fault scenarios, the first set of fault scenarios can include one or more fault scenarios that were previously run on the service under test and that were identified as important (e.g., because those previous fault scenarios result in the service under test crossing its SLO thresholds). In another embodiment, the first set of fault scenarios can include one or more fault scenarios that are known to be impactful to other services that have been tested, when the configuration of those services is similar to the current service under test (e.g., both services might use virtual machine (VM)s, switches, and a structured query language (SQL) server). For example, in some cases a service operator may periodically test the service under test and may record fault scenarios that were identified as important. These recorded fault scenarios can be reapplied to the service under test each time a change is made to the configuration of the service under test.

In one embodiment, each of the anomalies may include both a anomaly rate and a start and end time. In one embodiment, a set of anomalies from which the applied anomalies are randomly selected is determined based on the type of the computing resource being targeted.

At block 704, the method 700 includes applying each of the first plurality of fault scenarios to the service under test. In one embodiment, applying each of the first set of fault scenarios includes simulating the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include an increase in memory utilization of a memory device on a computing resource and the memory utilization can be simulated by executing a task by a processor to utilize a specified percentage of the memory device.

At block 706, the method 700 includes recording telemetry data regarding an operation of the service under test under each of the first plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 708, the method 700 includes selecting, based on the telemetry data, a first fault scenario from the first plurality of fault scenarios. In some embodiments, multiple fault scenarios can be identified based on the first plurality of fault scenarios. In one embodiment, the first fault scenario is selected based on a determination that a service level indicator, calculated based on the recorded telemetry data, regarding the operation of the service under test corresponding to the first fault scenario deviates from an expected value by more than a threshold amount. In one embodiment, SLIs are calculated for each of the first set fault scenarios and are compared with the expected value for each SLI to identify the first fault scenario as the fault scenario having the SLIs with the highest deviation from the expected value.

For example, an Availability SLI of the service under test may be calculated to be 89% based on the telemetry data and the expected value of the Availability SLI is 95% with a threshold deviation amount of 5%. In this example, the calculated Availability SLI associated with the first fault scenario deviates from the expected value 95% by more than the threshold amount of 5%. Accordingly, the first fault scenario is selected from the first plurality of fault scenarios.

In one embodiment, the first fault scenario is selected based on a determination that a SLI, calculated based on the recorded telemetry data, regarding the operation of the service under test corresponding to the first fault scenario is worse than the expected value, but is closest to the expected value (e.g., the availability was 94% when the service aims to have 95%+). In this embodiment, the service owner or operators can use the iterative testing to identify a point at which the service under test starts to become unhealthy (i.e., the point at which the service under test begins to fail to meet the service level objectives).

In one embodiment, the expected value of the service level indicator and the threshold amount are received from an operator of the service. In one embodiment, the operator of the service may provide SLOs that include an expected SLI value and a threshold deviation amount for each SLI. In another example, the operator of the service may provide SLOs that include a minimum and/or maximum value for each SLI.

In another embodiment, the expected value of the SLI is obtained based on an analysis of telemetry data regarding the operation of the service under test under normal operating conditions. For example, the service under test may be executed without the application of any fault scenarios and telemetry data can be collected and analyzed to calculate the expected values for each SLI.

At block 710, the method 700 includes generating, based at least in part on the first fault scenario, a second plurality of fault scenarios. In one embodiment, the chaos engine generates the second plurality of fault scenarios based at least in part on the first fault scenario. In one embodiment, the second plurality of fault scenarios are generated by applying random changes to the first fault scenario. In another embodiment, the chaos engine analyses the calculated SLIs corresponding to the first fault scenario and the anomalies applied in the first fault scenario and generates the second plurality of fault scenarios by making incremental changes to the anomalies applied in the first fault scenario.

In one embodiment, the second plurality of fault scenarios are generated using a machine learning model. Examples of suitable machine learning models include a support vector machine model, a feedforward neural network model, and a recurrent neural network model. The machine learning model is provided with an input including one or more of the configuration of the service under test, the first fault scenario, and the telemetry data corresponding to the first fault and responsively generates a second plurality of fault scenarios. The generated second plurality of fault scenarios are created such that the second set of fault scenarios will be more impactful to the service under test (e.g., the second set of fault scenarios are more likely to result in a fault, error, or degradation of the service under test). In one embodiment, machine learning model that has been trained to provide a plurality of fault scenarios based on an input of a configuration of service under test, an applied fault scenario, and the telemetry data corresponding to the applied fault scenario. According to one or more embodiments described herein, the training data includes configurations of services under test, a plurality of applied fault scenarios, and telemetry data corresponding to each of the plurality of applied fault scenarios. Once the training data is obtained, a training module receives the training data and an untrained model. The untrained model can have preset weights and biases, which can be adjusted during training. The training can be supervised learning, semi-supervised learning, unsupervised learning, reinforcement learning, and/or the like, including combinations and/or multiples thereof. The training may be performed multiple times (referred to as "epochs") until a suitable model is trained. Once trained, the trained model is configured to provide a plurality of fault scenarios based on an input of a configuration, a first fault scenario, and the telemetry data corresponding to the first fault scenario (e.g., real-world, non-training data). At block 712, the method 700 includes applying each of the second plurality of fault scenarios to the service under test. In one embodiment, applying each of the second set of fault scenarios includes simulating the one or more anomalies specified by the fault scenario in the computing environment in which the service under test is executing.

At block 714, the method 700 includes recording telemetry data regarding the operation of the service under test under each of the second plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 716, the method 700 includes analyzing the recorded telemetry data to identify a vulnerability of the service under test. In one embodiment, identifying a vulnerability of the service under test may include identifying a commonality of applied fault scenarios that correspond to recorded telemetry data having a SLI that deviates from an expected value by more than a threshold amount. For example, the SLIs calculated for each applied fault scenario may be compared with the provided SLOs for the service under test to identify a group of applied fault scenarios in which an SLO is not met. This group of fault scenarios are then analyzed to identify a commonality in the fault scenarios, such as a common anomaly, this common anomaly is then identified as a vulnerability of the service under test.

In one embodiment, identifying a vulnerability of the service under test includes identifying one or more of the fault scenarios that have SLIs that fail to meet the specified SLOs. In another embodiment, the vulnerability of the service under test is identified based on the chaos severity score corresponding to fault scenarios that have a calculated SLI that deviates from an expected value by more than a threshold amount. Fault scenarios with low chaos scores (that exceed the specified threshold) would be of particular interest to service owners, as they identify scenarios where a service become unhealthy with the least amount of disruption. For example, the fault scenarios having SLIs that fail to meet their SLOs are analyzed and the fault scenario having the lowest chaos severity score may be reported as including a vulnerability. In one embodiment, once the fault scenario having the lowest chaos severity score is identified, subsequent fault scenarios can be generated that incrementally reduce the volume of faults being injected to find the lowest level of chaos that can result in the SLI failing to meet the specified SLO.

In one embodiment, a chaos severity score is calculated for each of the applied fault scenarios. Each fault scenario may have a single chaos severity score value or a group of chaos severity score values organized by anomaly type or SLO. The chaos severity score for each anomaly type or SLO can be calculated based on the deviation of the SLI from the SLO. For example, a SLI that deviates from the corresponding SLO by two standard deviations may give a chaos severity score of 100 while a SLI that deviates from the corresponding SLO by one standard deviation may be give a chaos severity score of 50. In one embodiment, the single chaos severity score value for each fault scenario can be calculated as a weighted average of the group of chaos severity score values organized by anomaly type. The weights used to combine the group of chaos severity score values organized by anomaly type may be set by the operator of the service based on the relative importance of the SLOs of the service under test. For example, an SLO related to availability of the service under test may be given a higher weight than an SLO related to latency of the service under test.

For example, one fault scenario may have an overall chaos severity score of 75 and/or a chaos severity score of 90 for networking severity and a chaos severity score of 60 for compute severity. In one embodiment, the chaos severity score is determined based on one or more of the specific anomalies being applied (e.g., CPU pressure, dropped packets, and the like), the percentage of components in the service under test that are having an anomaly applied to them, the number of anomalies being applied, and the configuration of each anomaly (e.g., CPU pressure %, % of packets to drop, and the like). In one embodiment, the chaos severity score(s) of the fault scenarios that have SLIs that fail to meet the specified SLOs are used to identify a vulnerability of the service under test.

At decision block 718, the method 700 includes determining whether a vulnerability of the service under test has been identified. Based on a determination that a vulnerability of the service under test has been identified the method 700 proceeds to block 720 and reports the vulnerability of the service under test.

Based on a determination that a vulnerability of the service under test has not been identified the method 700 returns to block 710 and another plurality of fault scenarios is created. In one embodiment, an iterative process of applying fault scenarios, analyzing telemetry data of the service under test the fault scenarios, and responsively generating one or more additional fault scenarios is executed until a vulnerability of the service under test is identified or another termination condition is met. In one embodiment, the termination condition may be the completion of a total time allowed for the testing of various fault scenarios or the application of a specified number of fault scenarios.

Figure 8:
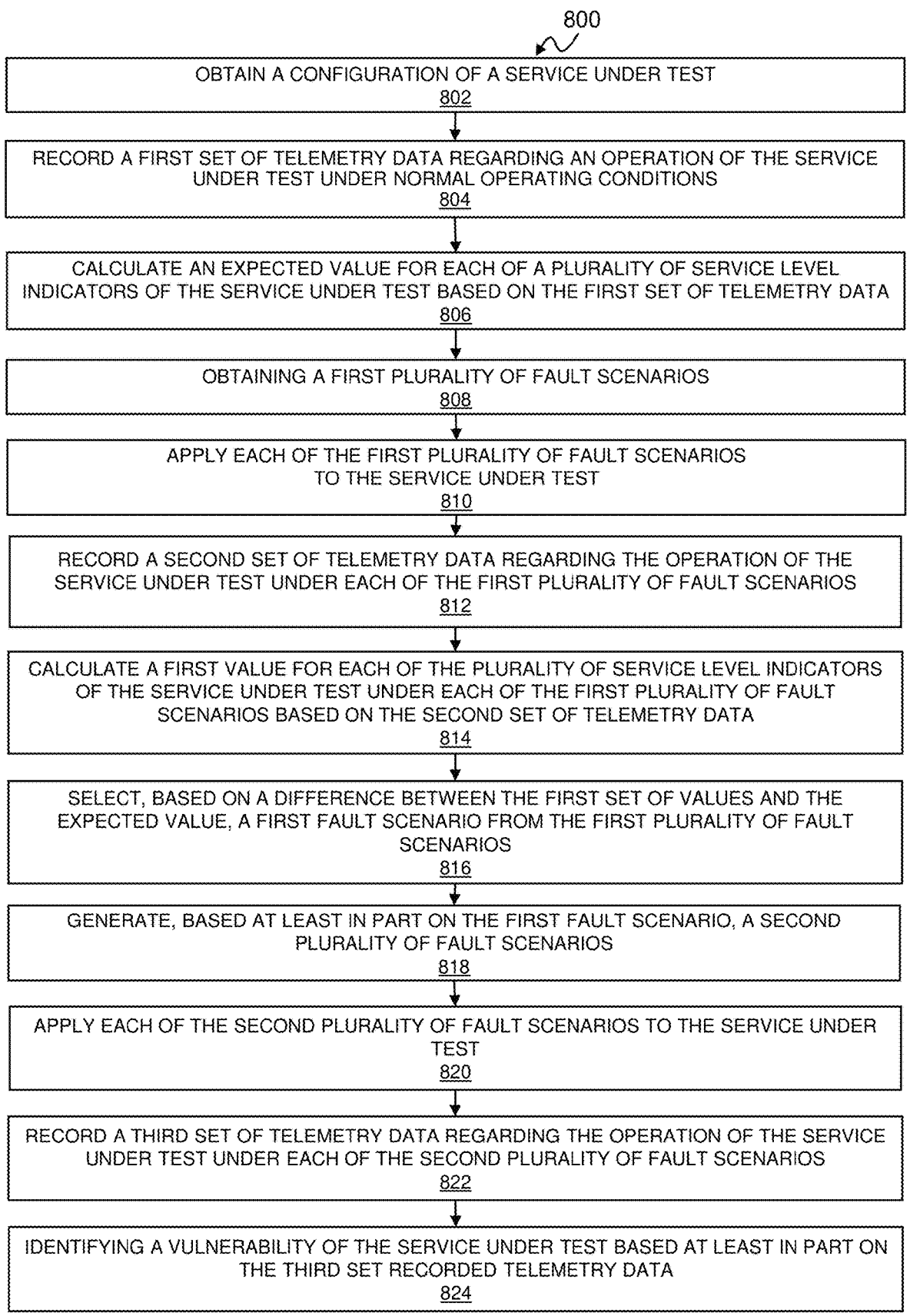
FIG. 8 depicts a flowchart of an example method for performing automated service validation with chaos engineering in accordance with one or more embodiments.

Referring now to FIG. 8, a flowchart of a method 800 for performing automated service validation with chaos engineering in accordance with one or more embodiments is shown. The method 800 is described with reference to FIGS. 1 to 6 and may include additional steps not depicted in FIG. 8. Although depicted in a particular order, the blocks depicted in FIG. 8 can be, in some embodiments, rearranged, subdivided, and/or combined.

At block 802, the method 800 begins by obtaining a configuration of a service under test. In one embodiment, the configuration of the service under test includes a plurality of computing resources utilized by the service under test and a relationship between one or more of the plurality of computing resources.

At block 804, the method 800 includes recording a first set of telemetry data regarding an operation of the service under test under normal operating conditions. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 806, the method 800 includes calculating an expected value for each of a plurality of SLIs of the service under test based on the first set of telemetry data. As discussed in more detail above, the SLIs can include availability SLIs, response time SLIs, throughput SLIs, error rate SLIs, latency SLIs, and capacity SLIs of the service under test 112.

At block 808, the method 800 includes obtaining a first plurality of fault scenarios. In one embodiment, each fault scenario includes one or more anomalies that are applied to computing resources of the configuration. Each anomaly is a disruption or failure of one or more of the computing resources in the configuration. In one embodiment, each anomaly includes an anomaly rate, such as a failure rate and/or a capacity reduction, for a computing resource and a start time of the anomaly and end time of the anomaly.

In one embodiment, the first set of fault scenarios is obtained based at least in part on the configuration of the service under test. For example, the chaos engine may be configured to obtain the configuration of the service under test and to identify a first set of fault scenarios based on the configuration of the service under test. This identification may be based on identifying one or more previously generated fault scenarios that were applied to similar configurations.

In one embodiment, one or more of the first set of fault scenarios are randomly generated by the chaos engine. For example, the chaos engine may be configured to obtain the configuration of the service under test, identify the computing resources in the configuration, and generate a random set of anomalies to create one or more of the first set of fault scenarios. In one embodiment, one or more of the first set of fault scenarios is selected from previous runs of the system.

For example, rather than starting with only randomly generated fault scenarios, the first set of fault scenarios can include one or more fault scenarios that were previously run on the service under test and that were identified as important (i.e., because those previous fault scenarios result in the service under test crossing its SLO thresholds). In another embodiment, the first set of fault scenarios can include one or more fault scenarios that are known to be impactful to other services that have been tested, when the configuration of those services is similar to the current service under test (e.g., both services might use VMs, switches, and a SQL server). For example, in some cases a service operator may periodically test the service under test and may record fault scenarios that were identified as important. These recorded fault scenarios can be reapplied to the service under test each time a change is made to the configuration of the service under test.

In one embodiment, each of the random anomalies may include both a randomly generated anomaly rate and a randomly generated start and end time. In one embodiment, a set of anomalies that the applied anomalies are randomly selected from is determined based on the type of the computing resource being targeted.

At block 810, the method 800 includes applying each of the first plurality of fault scenarios to the service under test. In one embodiment, applying each of the first set of fault scenarios includes simulating the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include a memory utilization of a memory device on a computing resource and the memory utilization can be simulated by a processor executing a task to utilize a specified percentage of the memory device.

At block 812, the method 800 includes recording a second set of telemetry data regarding an operation of the service under test under each of the first plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 814, the method 800 includes calculating a first value for each of the plurality of SLIs of the service under test under each of the first plurality of fault scenarios based on the second set of telemetry data. As discussed in more detail above, the SLIs can include availability SLIs, response time SLIs, throughput SLIs, error rate SLIs, latency SLIs, and capacity SLIs of the service under test 112.

At block 816, the method 800 includes selecting, based on a difference between the first set of values and the expected values, a first fault scenario from the first plurality of fault scenarios. In one embodiment, the first fault scenario is selected based on a determination that the first value for one of the SLIs deviates from an expected value of the SLIs by more than a threshold amount. In one embodiment, the threshold amount can be received from an operator of the service. In one embodiment, the SLIs calculated for each of the first set fault scenarios are compared with the provided SLOs for the service under test to identify the first fault scenario as the fault scenario having the SLIs with the highest deviation from the provided SLOs.

In one embodiment, the first fault scenario is selected based on a determination that a SLI, calculated based on the recorded telemetry data, regarding the operation of the service under test corresponding to the first fault scenario is worse than the expected value, but is closest to the expected value (e.g., the availability was 94% when the service aims to have 95%+). In this embodiment, the service owner/operators can use the iterative testing to identify a point at which the service under test starts to become unhealthy (i.e., the point at which the service under test begins to fail to meet the service level objectives).

For example, an Availability SLI of the service under test during a fault scenario may be calculated to be 89% based on the telemetry data. The expected value of the Availability SLI is 95% with a threshold deviation amount of 5%. In this example, the calculated Availability SLI associated with the first fault scenario deviates from the expected value 95% by more than the threshold amount of 5%. Accordingly, the first fault scenario is selected from the first plurality of fault scenarios.

At block 818, the method 800 includes generating, based at least in part on the first fault scenario, a second plurality of fault scenarios. In one embodiment, the chaos engine generates the second plurality of fault scenarios based at least in part on the first fault scenario. In another embodiment, the chaos engine generates the second plurality of fault scenarios based on multiple identified fault scenarios of the first plurality of fault scenarios. In one embodiment, the second plurality of fault scenarios are generated by applying random changes to the first fault scenario. In another embodiment, the chaos engine analyses the calculated SLIs corresponding to the first fault scenario and the anomalies applied in the first fault scenario and generates the second plurality of fault scenarios by making incremental changes to the anomalies applied in the first fault scenario.

At block 820, the method 800 includes applying each of the second plurality of fault scenarios to the service under test. In one embodiment, applying each of the second set of fault scenarios includes simulating the one or more anomalies specified by the fault scenario in the computing environment in which the service under test is executing.

At block 822, the method 800 includes recording a third set of telemetry data regarding the operation of the service under test under each of the second plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 824, the method 800 includes identifying a vulnerability of the service under test based at least in part on the third set of recorded telemetry data. In one embodiment, identifying a vulnerability of the service under test can include identifying a commonality of applied fault scenarios that correspond to recorded telemetry data having a SLI that deviates from an expected value by more than a threshold amount. For example, the SLIs calculated for each applied fault scenario may be compared with the provided SLOs for the service under test to identify a group of applied fault scenarios in which an SLO is not met. This group of fault scenarios are then analyzed to identify a commonality in the fault scenarios, such as a common anomaly, this common anomaly is then identified as a vulnerability of the service under test. In another embodiment, identifying a vulnerability of the service under test includes identifying one or more of the fault scenarios that have SLIs that fail to meet the specified SLOs. In another embodiment, the vulnerability of the service under test is identified based on the chaos severity score corresponding to fault scenarios that have a calculated SLI that deviates from an expected value by more than a threshold amount. For example, the fault scenarios having SLIs that fail to meet their SLOs are analyzed and the fault scenario having the lowest chaos severity score may be reported as including a vulnerability.

In one embodiment, a chaos severity score is calculated for each of the applied fault scenarios. Each fault scenario may have a single chaos severity score value or a group of chaos severity score values organized by anomaly type or SLO. The chaos severity score for each anomaly type or SLO can be calculated based on the deviation of the SLI from the SLO. For example, a SLI that deviates from the corresponding SLO by two standard deviations may be give a chaos severity score of 100 while a SLI that deviates from the corresponding SLO by one standard deviation may be give a chaos severity score of 50. In one embodiment, the single chaos severity score value for each fault scenario can be calculated as a weighted average of the group of chaos severity score values organized by anomaly type. The weights used to combine the group of chaos severity score values organized by anomaly type may be set by the operator of the service based on the relative importance of the SLOs of the service under test. For example, an SLO related to availability of the service under test may be given a higher weight than an SLO related to latency of the service under test.

For example, one fault scenario may have an overall chaos severity score of 75 and/or a chaos severity score of 90 for networking severity and a chaos severity score of 60 for compute severity. In one embodiment, the chaos severity score is determined based on one or more of the specific anomalies being applied (e.g., CPU pressure, dropped packets, and the like), the percentage of components in the service under test that are having an anomaly applied to them, the number of anomalies being applied, and the configuration of each anomaly (e.g., CPU pressure %, % of packets to drop, and the like). In one embodiment, the chaos severity score(s) of the fault scenarios that have SLIs that fail to meet the specified SLOs are used to identify a vulnerability of the service under test.

In one embodiment, an iterative process of applying fault scenarios, analyzing telemetry data of the service under test the fault scenarios, and responsively generating one or more additional fault scenarios is executed until a vulnerability of the service under test is identified or another termination condition is met. In one embodiment, the termination condition may be the completion of a total time allowed for the testing of various fault scenarios or the application of a specified number of fault scenarios.

Figure 9:
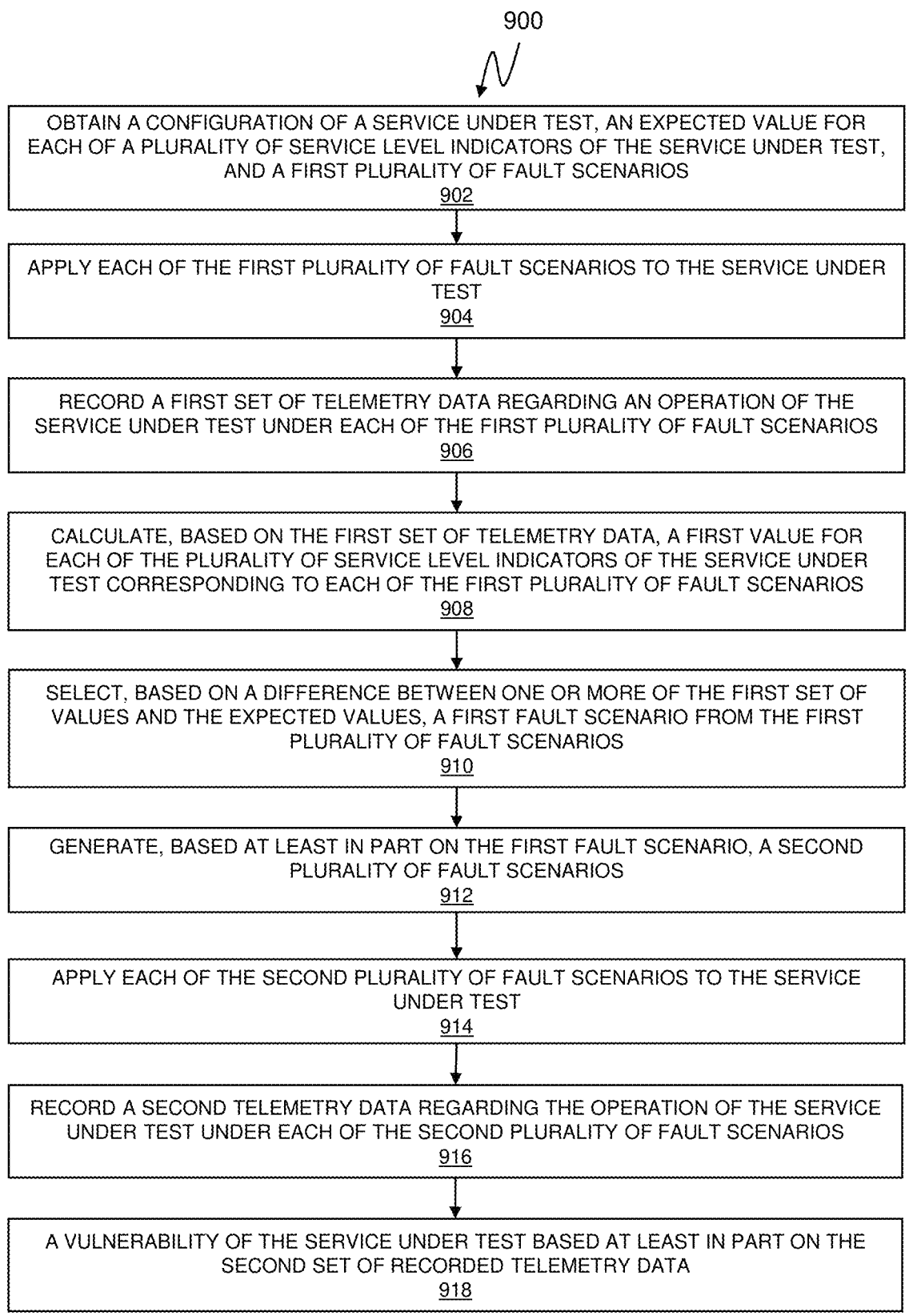
FIG. 9 depicts a flowchart of an example method for performing automated service validation with chaos engineering in accordance with one or more embodiments.

Referring now to FIG. 9, a flowchart of a method 900 for performing automated service validation with chaos engineering in accordance with one or more embodiments is shown. The method 900 is described with reference to FIGS. 1 to 6 and may include additional steps not depicted in FIG. 9. Although depicted in a particular order, the blocks depicted in FIG. 9 can be, in some embodiments, rearranged, subdivided, and/or combined.

At block 902, the method 900 begins by obtaining a configuration of a service under test, an expected value for each of a plurality of SLIs of the service under test, and a first plurality of fault scenarios. In one embodiment, the configuration of the service under test includes a plurality of computing resources utilized by the service under test and a relationship between one or more of the plurality of computing resources. In one embodiment, the expected value of the SLI and the threshold amount are received from an operator of the service.

In one embodiment, each fault scenario includes one or more anomalies that are applied to computing resources of the configuration. Each anomaly is a disruption or failure of one or more of the computing resources in the configuration. In one embodiment, each anomaly includes an anomaly rate, such as a failure rate and/or a capacity reduction, for a computing resource and a start time of the anomaly and end time of the anomaly.

In one embodiment, the first set of fault scenarios is obtained based at least in part on the configuration. For example, the chaos engine may be configured to obtain the configuration of the service under test and to identify a first set of fault scenarios based on the configuration of the service under test. This identification may be based on identifying one or more previously generated fault scenarios that were applied to similar configurations.

In one embodiment, one or more of the first set of fault scenarios are randomly generated by the chaos engine. For example, the chaos engine may be configured to obtain the configuration of the service under test, identify the computing resources in the configuration, and generate a random set of anomalies to create one or more of the first set of fault scenarios. In one embodiment, one or more of the first set of fault scenarios is selected from previous runs of the system. For example, rather than starting with only randomly generated fault scenarios, the first set of fault scenarios can include one or more fault scenarios that were previously run on the service under test and that were identified as important (i.e., because those previous fault scenarios result in the service under test crossing its SLO thresholds). In another embodiment, the first set of fault scenarios can include one or more fault scenarios that are known to be impactful to other services that have been tested, when the configuration of those services is similar to the current service under test (e.g., both services might use VMs, switches, and a SQL server). For example, in some cases a service operator may periodically test the service under test and may record fault scenarios that were identified as important. These recorded fault scenarios can be reapplied to the service under test each time a change is made to the configuration of the service under test.

In one embodiment, each of the random anomalies may include both a randomly generated anomaly rate and a randomly generated start and end time. In one embodiment, a set of anomalies that the applied anomalies are randomly selected from is determined based on the type of the computing resource being targeted.

At block 904, the method 900 includes applying each of the first plurality of fault scenarios to the service under test. In one embodiment, applying each of the first set of fault scenarios includes simulating the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include a memory utilization of a memory device on a computing resource and the memory utilization can be simulated by a processor executing a task to utilize a specified percentage of the memory device.

At block 906, the method 900 includes recording a first set of telemetry data regarding an operation of the service under test under each of the first plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 908, the method 900 includes calculating, based on the first set of telemetry data, a first value for each of the plurality of SLIs of the service under test under each of the first plurality of fault scenarios. As discussed in more detail above, the SLIs can include availability SLIs, response time SLIs, throughput SLIs, error rate SLIs, latency SLIs, and capacity SLIs of the service under test 112.

At block 910, the method 900 includes selecting, based on a difference between one or more of the first set of values and the expected values, a first fault scenario from the first plurality of fault scenarios. In one embodiment, the SLIs calculated for each of the first set fault scenarios are compared with the provided SLOs for the service under test to identify the first fault scenario as the fault scenario having the SLIs with the highest deviation from the provided SLOs.

At block 912, the method 900 includes generating, based at least in part on the first fault scenario, a second plurality of fault scenarios. In one embodiment, the chaos engine generates the second plurality of fault scenarios based at least in part on the first fault scenario. In another embodiment, the chaos engine generates the second plurality of fault scenarios based on multiple identified fault scenarios of the first plurality of fault scenarios. In one embodiment, the second plurality of fault scenarios are generated by applying random changes to the first fault scenario. In another embodiment, the chaos engine analyses the calculated SLIs corresponding to the first fault scenario and the anomalies applied in the first fault scenario and generates the second plurality of fault scenarios by making incremental changes to the anomalies applied in the first fault scenario.

At block 914, the method 900 includes applying each of the second plurality of fault scenarios to the service under test. In one embodiment, applying each of the second set of fault scenarios includes simulating the one or more anomalies specified by the fault scenario in the computing environment in which the service under test is executing.

At block 916, the method 900 includes recording a second set of telemetry data regarding the operation of the service under test under each of the second plurality of fault scenarios. In one embodiment, the telemetry data is collected by the computing environment and stored in a telemetry metric database. The telemetry data provides real-time information about the state and performance of the computing resources utilized by the service under test. As discussed in more detail above, the collected telemetry data can include CPU usage, memory usage, disk I/O, network traffic, system load, application performance, event logs, power and temperature, and other custom metrics.

At block 918, the method 900 includes identifying a vulnerability of the service under test based at least in part on the second set of recorded telemetry data. In one embodiment, identifying a vulnerability of the service under test includes identifying a commonality of applied fault scenarios that correspond to recorded telemetry data having a SLI that deviates from an expected value by more than a threshold amount. For example, the SLIs calculated for each applied fault scenario may be compared with the provided SLOs for the service under test to identify a group of applied fault scenarios in which an SLO is not met. This group of fault scenarios are then analyzed to identify a commonality in the fault scenarios, such as a common anomaly, this common anomaly is then identified as a vulnerability of the service under test. In another embodiment, identifying a vulnerability of the service under test includes identifying one or more of the fault scenarios that have SLIs that fail to meet the specified SLOs. In another embodiment, the vulnerability of the service under test is identified based on the chaos severity score corresponding to fault scenarios that have a calculated SLI that deviates from an expected value by more than a threshold amount. For example, the fault scenarios having SLIs that fail to meet their SLOs are analyzed and the fault scenario having the lowest chaos severity score may be reported as including a vulnerability.

In one embodiment, a chaos severity score is calculated for each of the applied fault scenarios. Each fault scenario may have a single chaos severity score value or a group of chaos severity score values organized by anomaly type or SLO. The chaos severity score for each anomaly type or SLO can be calculated based on the deviation of the SLI from the SLO. For example, a SLI that deviates from the corresponding SLO by two standard deviations may be give a chaos severity score of 100 while a SLI that deviates from the corresponding SLO by one standard deviation may be give a chaos severity score of 50. In one embodiment, the single chaos severity score value for each fault scenario can be calculated as a weighted average of the group of chaos severity score values organized by anomaly type. The weights used to combine the group of chaos severity score values organized by anomaly type may be set by the operator of the service based on the relative importance of the SLOs of the service under test. For example, an SLO related to availability of the service under test may be given a higher weight than an SLO related to latency of the service under test.

For example, one fault scenario may have an overall chaos severity score of 75 and/or a chaos severity score of 90 for networking severity and a chaos severity score of 60 for compute severity. In one embodiment, the chaos severity score is determined based on one or more of the specific anomalies being applied (e.g., CPU pressure, dropped packets, and the like), the percentage of components in the service under test that are having an anomaly applied to them, the number of anomalies being applied, and the configuration of each anomaly (e.g., CPU pressure %, % of packets to drop, and the like). In one embodiment, the chaos severity score(s) of the fault scenarios that have SLIs that fail to meet the specified SLOs are used to identify a vulnerability of the service under test.

In one embodiment, an iterative process of applying fault scenarios, analyzing telemetry data of the service under test the fault scenarios, and responsively generating one or more additional fault scenarios is executed until a vulnerability of the service under test is identified or another termination condition is met. In one embodiment, the termination condition may be the total time allowed for the testing of various fault scenarios or the application of a total number of fault scenarios.

Figure 10:
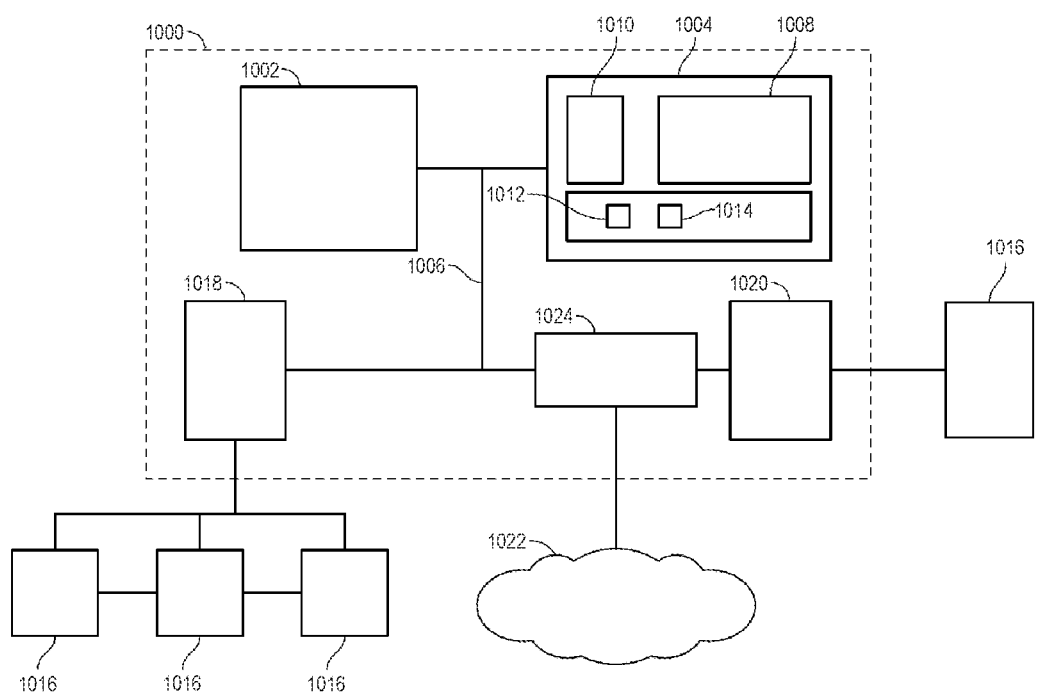
FIG. 10 depicts a block diagram of an example computer system according to one or more embodiments.

FIG. 10 illustrates aspects of an embodiment of a computer system 1000 that can perform various aspects of embodiments described herein. In some embodiments, the computer system(s) 1000 can implement and/or otherwise be incorporated within or in combination with any of the methods 700, 800, and 900 described previously herein. In some embodiments, a computer system 1000 can be configured to carry out the functionality of the computing environment 110. In some embodiments, a computer system 1000 can be configured to carry out the functionality of the performance analysis system 120.

The computer system 1000 includes at least one processing device 1002, which generally includes one or more processors or processing units for performing a variety of functions, such as, for example, completing any portion of the methods 700, 800, and 900 described previously herein. Components of the computer system 1000 also include a system memory 1004, and a bus 1006 that couples various system components including the system memory 1004 to the processing device 1002. The system memory 1004 may include a variety of computer system readable media. Such media can be any available media that is accessible by the processing device 1002, and includes both volatile and non-volatile media, and removable and non-removable media. For example, the system memory 1004 includes a non-volatile memory 1008 such as a hard drive, and may also include a volatile memory 1010, such as random access memory (RAM) and/or cache memory. The computer system 1000 can further include other removable/non-removable, volatile/non-volatile computer system storage media.

The system memory 1004 can include at least one program product having a set (e.g., at least one) of program modules that are configured to carry out functions of the embodiments described herein. For example, the system memory 1004 stores various program modules that generally carry out the functions and/or methodologies of embodiments described herein. A module or modules 1012, 1014 may be included to perform functions related to the methods 700, 800, and 900 as described previously herein. The computer system 1000 is not so limited, as other modules may be included depending on the desired functionality of the computer system 1000. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 1002 can also be configured to communicate with one or more external devices 1016 such as, for example, a keyboard, a pointing device, and/or any devices (e.g., a network card, a modem, and the like) that enable the processing device 1002 to communicate with one or more other computing devices. Communication with various devices can occur via Input/Output (I/O) interfaces 1018 and 1020.

The processing device 1002 may also communicate with one or more networks 1022 such as a local area network (LAN), a general wide area network (WAN), a bus network and/or a public network (e.g., the Internet) via a network adapter 1024. In some embodiments, the network adapter 1024 is or includes an optical network adaptor for communication over an optical network. It should be understood that although not shown, other hardware and/or software components may be used in conjunction with the computer system 1000. Examples include microcode, device drivers, redundant processing units, external disk drive arrays, RAID systems, and data archival storage systems.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the disclosure are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", and "passing to" describe a communication path between two elements and does not imply a direct connection between the elements with no intervening elements and connections therebetween unless specified. A respective communication path can be a direct or indirect communication path.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a plurality of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
   obtaining a configuration of a service under test, the configuration of the service includes a plurality of computing resources utilized by the service and a relationship between individual computing resources of the plurality of computing resources;
   obtaining a first plurality of fault scenarios, each fault scenario of the first plurality of fault scenarios including an anomaly that is applied to a corresponding computing resource of the plurality of computing resources;
   applying each of the first plurality of fault scenarios to the service under test;
   recording telemetry data regarding an operation of the service under test under each of the first plurality of fault scenarios;
   selecting, based on the telemetry data, a first fault scenario from the first plurality of fault scenarios having a highest deviation from an expected value of a service level indicator (SLI) of the service under test;
   generating, based at least in part on the first fault scenario, a second plurality of fault scenarios by applying incremental changes to the respective anomaly applied in the first fault scenario;
   applying each of the second plurality of fault scenarios to the service under test;
   recording additional telemetry data regarding the operation of the service under test under each of the second plurality of fault scenarios; and
   identifying a vulnerability of the service under test based on the recorded additional telemetry data in determination that there is at least one vulnerability present based on the recorded additional telemetry data.

2. The method of claim 1, wherein the anomaly includes an anomaly rate that is applied to the computing resource and a start time of the anomaly and end time of the anomaly.

3. The method of claim 1, wherein the first plurality of fault scenarios is obtained based at least in part on the plurality of computing resources utilized by the service under test.

4. The method of claim 1, where at least one of the first plurality of fault scenarios are randomly generated.

5. The method of claim 1, wherein the first fault scenario is selected from the first plurality of fault scenarios based on a determination that a service level indicator of the recorded telemetry data regarding the operation of the service under test corresponding to the first fault scenario deviates from an expected value by more than a threshold amount.

6. The method of claim 5, wherein the expected value of the service level indicator is obtained based on an analysis of telemetry data regarding the operation of the service under test under normal operating conditions.

7. The method of claim 1, wherein at least one of the second plurality of fault scenarios is generated by applying random changes to the first fault scenario.

8. The method of claim 1, wherein the vulnerability of the service under test is identified based on a commonality of anomalies of applied fault scenarios that correspond to recorded telemetry data having a service level indicator that deviates from an expected value by more than a threshold amount.

9. The method of claim 1, further comprising calculating a chaos severity score for each of the applied fault scenarios, the chaos severity score corresponding to recorded telemetry data having a service level indicator that deviates from an expected value by more than a threshold amount, and wherein the vulnerability of the service under test is identified based on the chaos severity score.

10. The method of claim 1, wherein at least one of the second plurality of fault scenarios is generated by a machine learning model based on the first fault scenario, the telemetry data regarding the operation of the service under test under the first fault scenario, and the configuration.

11. A method comprising:
  obtaining a configuration of a service under test, the configuration of the service includes a plurality of computing resources utilized by the service and a relationship between individual computing resources of the plurality of computing resources;
  recording a first set of telemetry data regarding an operation of the service under test under normal operating conditions;
  calculating an expected value for each of a plurality of service level indicators of the service under test based on the first set of telemetry data;
  obtaining a first plurality of fault scenarios, each fault scenario of the first plurality of fault scenarios including an anomaly that is applied to a corresponding computing resource of the plurality of computing resources;
  applying each of the first plurality of fault scenarios to the service under test;
  recording a second set of telemetry data regarding the operation of the service under test under each of the first plurality of fault scenarios;
  calculating a first result value for each of the plurality of service level indicators of the service under test under each of the first plurality of fault scenarios based on the second set of telemetry data;
  selecting, based on a difference between the first result values and the expected values, a first fault scenario from the first plurality of fault scenarios having a highest deviation from an expected value of a service level indicator of the service under test;
  generating, based at least in part on the first fault scenario, a second plurality of fault scenarios by applying incremental changes to an anomaly applied in the first fault scenario;
  applying each of the second plurality of fault scenarios to the service under test;
  recording a third set of telemetry data regarding the operation of the service under test under each of the second plurality of fault scenarios; and
  identifying a vulnerability of the service under test based at least in part on the third set of telemetry data, in determination that there is at least one vulnerability present based on recorded telemetry data;
  wherein the configuration of the service under test includes a plurality of computing resources utilized by the service under test and a relationship between one or more of the plurality of computing resources and wherein each fault scenario includes an anomaly that is applied to a computing resource of the configuration.

12. The method of claim 11, wherein the anomaly includes an anomaly rate that is applied to the computing resource and a start time of the anomaly and end time of the anomaly.

13. The method of claim 11, further comprising calculating a second value for each of the plurality of service level indicators of the service under test under each of the second plurality of fault scenarios based on the third set of telemetry data.

14. The method of claim 13, wherein the vulnerability of the service under test is identified based on a commonality of anomalies of one or more of the first plurality of fault scenarios and the second plurality of fault scenarios for which one of the first result values and the second values deviate from the expected value by more than a threshold amount.

15. The method of claim 11, wherein the first plurality of fault scenarios is obtained based at least in part on the plurality of computing resources utilized by the service under test.

16. The method of claim 11, wherein at least one of the second plurality of fault scenarios is generated by a machine learning model based on the first fault scenario, the telemetry data regarding the operation of the service under test under the first fault scenario, and the configuration.

17. The method of claim 11, further comprising calculating a chaos severity score for each of the applied fault scenarios, the chaos severity score corresponding to recorded telemetry data having service level indicators that deviate from an expected value by more than a threshold amount, and wherein the vulnerability of the service under test is identified based on the chaos severity score.

18. A method comprising:
  obtaining a configuration of a service under test, an expected value for each of a plurality of service level indicators of the service under test, and a first plurality of fault scenarios, each fault scenario of the first plurality of fault scenarios including an anomaly that is applied to a computing resource of the service;
  applying each of the first plurality of fault scenarios to the service under test;
  recording a first set of telemetry data regarding an operation of the service under test under each of the first plurality of fault scenarios;
  calculating, based on the first set of telemetry data, a first value for each of the plurality of service level indicators of the service under test corresponding to each of the first plurality of fault scenarios;
  selecting, based on a difference between one or more of the first values and the expected values, a first fault scenario from the first plurality of fault scenarios having a highest deviation from an expected value of a service level indicator of the service under test;
  generating, based at least in part on the first fault scenario, a second plurality of fault scenarios by applying incremental changes to the respective anomaly applied in the first fault scenario;
  applying each of the second plurality of fault scenarios to the service under test;
  recording a second set of telemetry data regarding the operation of the service under test under each of the second plurality of fault scenarios; and
  identifying a vulnerability of the service under test based at least in part on the second set of recorded telemetry data,
  wherein the configuration of the service under test includes a plurality of computing resources utilized by the service under test and a relationship between one or more of the plurality of computing resources and wherein each fault scenario includes an anomaly that is applied to a computing resource of the configuration.

19. The method of claim 18, wherein the first plurality of fault scenarios is obtained based at least in part on the plurality of computing resources utilized by the service under test.

20. The method of claim 18, wherein at least one of the second plurality of fault scenarios is generated by a machine learning model based on the first fault scenario, the telemetry data regarding the operation of the service under test under the first fault scenario, and the configuration.

* * * * *